US011901673B2

(12) United States Patent
Asano

(10) Patent No.: US 11,901,673 B2
(45) Date of Patent: Feb. 13, 2024

(54) CONNECTOR HAVING SHIELD MEMBER MOUNTED IN HOUSING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Yasunori Asano, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 115 days.

(21) Appl. No.: 17/615,189

(22) PCT Filed: May 27, 2020

(86) PCT No.: PCT/JP2020/020877
§ 371 (c)(1),
(2) Date: Nov. 30, 2021

(87) PCT Pub. No.: WO2020/255648
PCT Pub. Date: Dec. 24, 2020

(65) Prior Publication Data

US 2022/0231463 A1 Jul. 21, 2022

(30) Foreign Application Priority Data

Jun. 17, 2019 (JP) ................................ 2019-111718

(51) Int. Cl.
*H01R 13/6474* (2011.01)
*H01R 13/50* (2006.01)
(Continued)

(52) U.S. Cl.
CPC ....... *H01R 13/6474* (2013.01); *H01R 12/716* (2013.01); *H01R 13/50* (2013.01);
(Continued)

(58) Field of Classification Search
CPC .. H01R 13/6474; H01R 12/716; H01R 13/50; H01R 13/6473; H01R 13/648;
(Continued)

(56) References Cited

U.S. PATENT DOCUMENTS 6,129,555 A 10/2000 Daikuhara et al.
7,347,721 B2 3/2008 Kameyama
2004/0005815 A1 1/2004 Mizumura et al.

FOREIGN PATENT DOCUMENTS

JP H10-510949 A 10/1998
JP 2006-269107 A 10/2006
(Continued)

OTHER PUBLICATIONS

International Search Report dated Aug. 4, 2020 for WO 2020/255648 A1 (4 pages).

*Primary Examiner* — Abdullah A Riyami
*Assistant Examiner* — Justin M Kratt
(74) *Attorney, Agent, or Firm* — Venjuris, P.C.

(57) ABSTRACT

It is aimed to provide a connector capable of adjusting transmission characteristics while suppressing a manufacturing cost increase. A connector is provided with a housing including an accommodating portion and mounting portions, a terminal fitting to be accommodated into the accommodating portion, and a shield member to be mounted into the mounting portions for shielding electromagnetic waves. The mounting portions are provided at a plurality of positions at different distances from the accommodating portion. For example, the mounting portion is in the form of a groove and one end is open in one surface of the housing.

7 Claims, 9 Drawing Sheets

(51) Int. Cl.

| | |
|---|---|
| ***H01R 13/6581*** | (2011.01) |
| ***H01R 13/648*** | (2006.01) |
| ***H01R 13/6473*** | (2011.01) |
| ***H01R 12/71*** | (2011.01) |
| *H01R 13/6594* | (2011.01) |
| *H01R 13/40* | (2006.01) |
| *H01R 13/658* | (2011.01) |

(52) U.S. Cl.
CPC ....... *H01R 13/648* (2013.01); *H01R 13/6473* (2013.01); *H01R 13/6581* (2013.01); *H01R 13/40* (2013.01); *H01R 13/658* (2013.01); *H01R 13/6594* (2013.01)

(58) Field of Classification Search
CPC .. H01R 13/6581; H01R 13/40; H01R 13/658; H01R 13/6594
See application file for complete search history.

(56) References Cited

FOREIGN PATENT DOCUMENTS

JP 2006269107 A * 10/2006
JP 2010-146776 A 7/2010

* cited by examiner

CONNECTOR HAVING SHIELD MEMBER MOUNTED IN HOUSING

CROSS REFERENCE TO RELATED APPLICATIONS

This application is a national phase of PCT application No. PCT/JP2020/020877, filed on 27 May 2020, which claims priority from Japanese patent application No. 2019-111718, filed on 17 Jun. 2019, all of which are incorporated herein by reference.

TECHNICAL FIELD

The present disclosure relates to a connector.

BACKGROUND

A connector described in Patent Document 1 includes a connector housing having a plurality of terminal accommodation chambers and a shield shell for surrounding the outer periphery of the connector housing. The shield shell is electrically connected to a ground wire and constitute a ground circuit. The connector housing includes partition walls interposed between adjacent ones of the terminal accommodation chambers. The partition walls are provided with lightening portions for matching an impedance of the connector with that of a cable. Transmission characteristics of the connector can be adjusted by the shield shell and the lightening portions.

PRIOR ART DOCUMENT

Patent Document

Patent Document 1: JP 2007-123025 A

SUMMARY OF THE INVENTION

Problems to be Solved

If a mating member to be connected to the connector is changed, the shape of the housing or the like have to be changed according to transmission characteristics of the changed mating member. As a result, there is a problem of increasing manufacturing cost.

Accordingly, it is aimed to provide a connector capable of adjusting transmission characteristics while suppressing a manufacturing cost increase.

Means to Solve the Problem

The present disclosure is directed to a connector with a housing including an accommodating portion and mounting portions, a terminal fitting to be accommodated into the accommodating portion, and a shield member to be mounted into the mounting portions for shielding electromagnetic waves, wherein the mounting portions are provided at a plurality of positions at different distances from the accommodating portion.

Effect of the Invention

According to the present disclosure, it is possible to provide a connector capable of adjusting transmission characteristics while suppressing a manufacturing cost increase.

DETAILED DESCRIPTION TO EXECUTE THE INVENTION

Description of Embodiments of Present Disclosure

Figure 1:
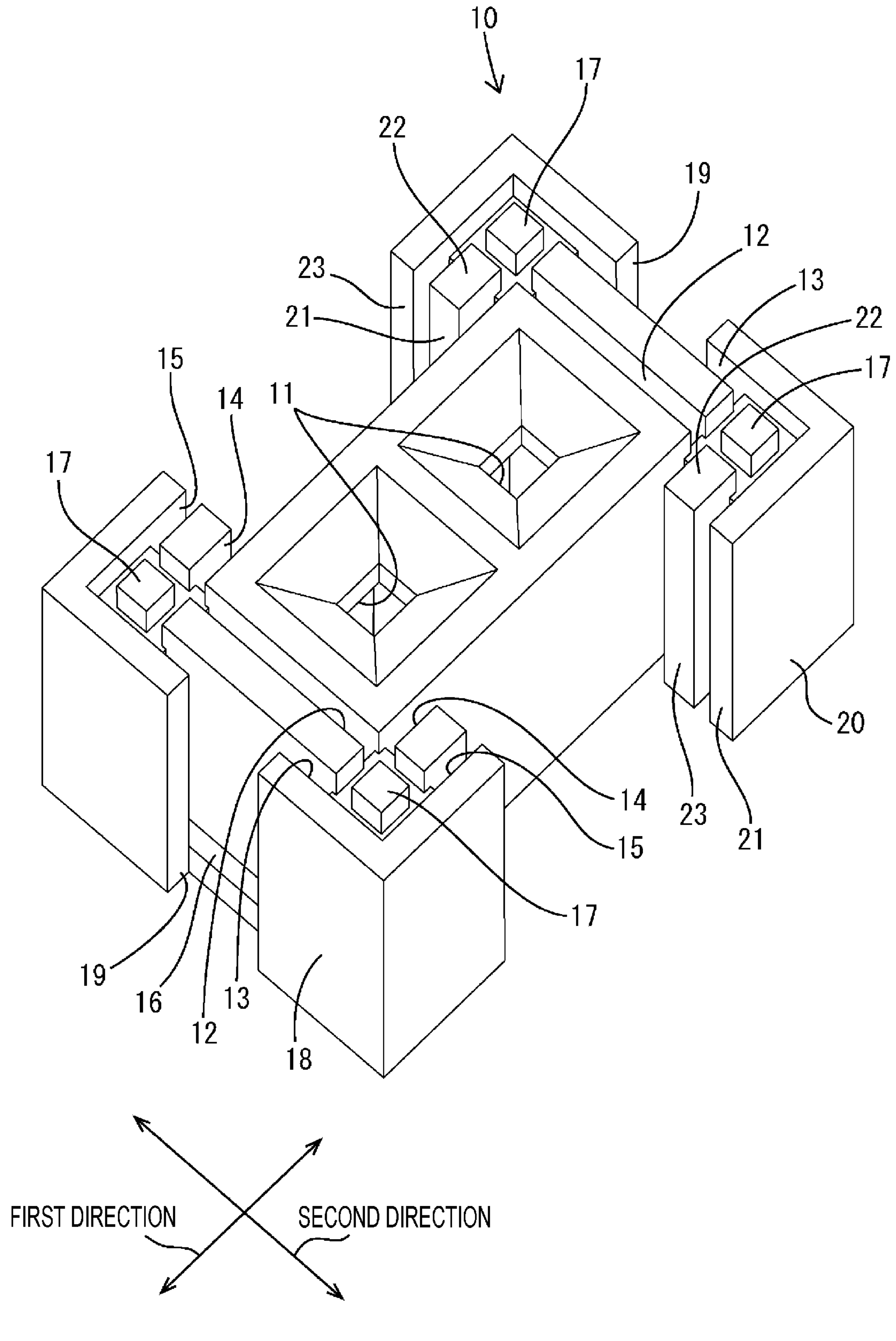
FIG. 1 is a perspective view of a housing in a connector according to an embodiment.

First, embodiments of the present disclosure are listed and described.

(1) The connector of the present disclosure is provided with a housing including an accommodating portion and mounting portions, a terminal fitting to be accommodated into the accommodating portion, and a shield member to be mounted into the mounting portions for shielding electromagnetic waves, wherein the mounting portions are provided at a plurality of positions at different distances from the accommodating portion. According to this configuration, transmission characteristics of the connector can be matched with those of a mating member by mounting the shield member into the appropriate mounting portions selected from the plurality of mounting portions. Thus, it is not necessary to newly provide a housing or the like for the adjustment of the transmission characteristics. As a result, a manufacturing cost increase can be suppressed.

(2) Preferably, the mounting portion is in the form of a groove and one end is open in one surface of the housing. According to this configuration, a mold structure for molding the mounting portions is not particularly complicated. Further, the shield member can be easily mounted, such as by being press-fit into the mounting portions.

(3) The mounting portions may include first mounting portions arranged on both sides in a first direction across the accommodating portion and second mounting portions arranged on both sides in a second direction intersecting the first direction across the accommodating portion, and the shield member may include first shield plates to be mounted into the first mounting portions and second shield plates to be mounted into the second mounting portions. According to this configuration, since the mount positions of the first shield plates with respect to the first mounting portions and those of the second shield plates with respect to the second mounting portions can be changed, a selection range in adjusting the transmission characteristics can be widened.

(4) The first shield plates may be plate members having the same shape and commonly used for a plurality of the first mounting portions at different distances in the first direction from the accommodating portion and the second shield plates may be plate members having the same shape and commonly used for a plurality of the second mounting portions at different distances in the second direction from the accommodating portion. According to this configuration, it is not necessary to provide a plurality of types of the first shield plates and the second shield plates and an increase in the number of components can be prevented.

(5) The first shield plates and the second shield plates may include first contact portions and second contact portions for contacting each other while intersecting each other. According to this configuration, since the first and second shield plates are electrically connected via the first and second contact portions, it is not necessary to provide an individual earth circuit (ground circuit) for each of the first and second shield plates.

(6) The shield member may include a board connecting portion to be connected to a circuit board, and the housing may be fixed to the circuit board via the board connecting portion. According to this configuration, it is not necessary to provide a member for fixing the housing to the circuit board separately from the shield member, and the structure of the connector can be simplified.

Details of Embodiment of Present Disclosure

A specific example of a connector of the present disclosure is described with reference to the drawings. Note that the present disclosure is not limited to this illustration and is intended to be represented by claims and include all changes in the scope of claims and in the meaning and scope of equivalents.

A connector according to an embodiment includes a housing 10, terminal fittings 40 to be accommodated into the housing 10, and a shield member 50, 51 to be mounted into the housing 10.

<Housing 10>

Figure 2:
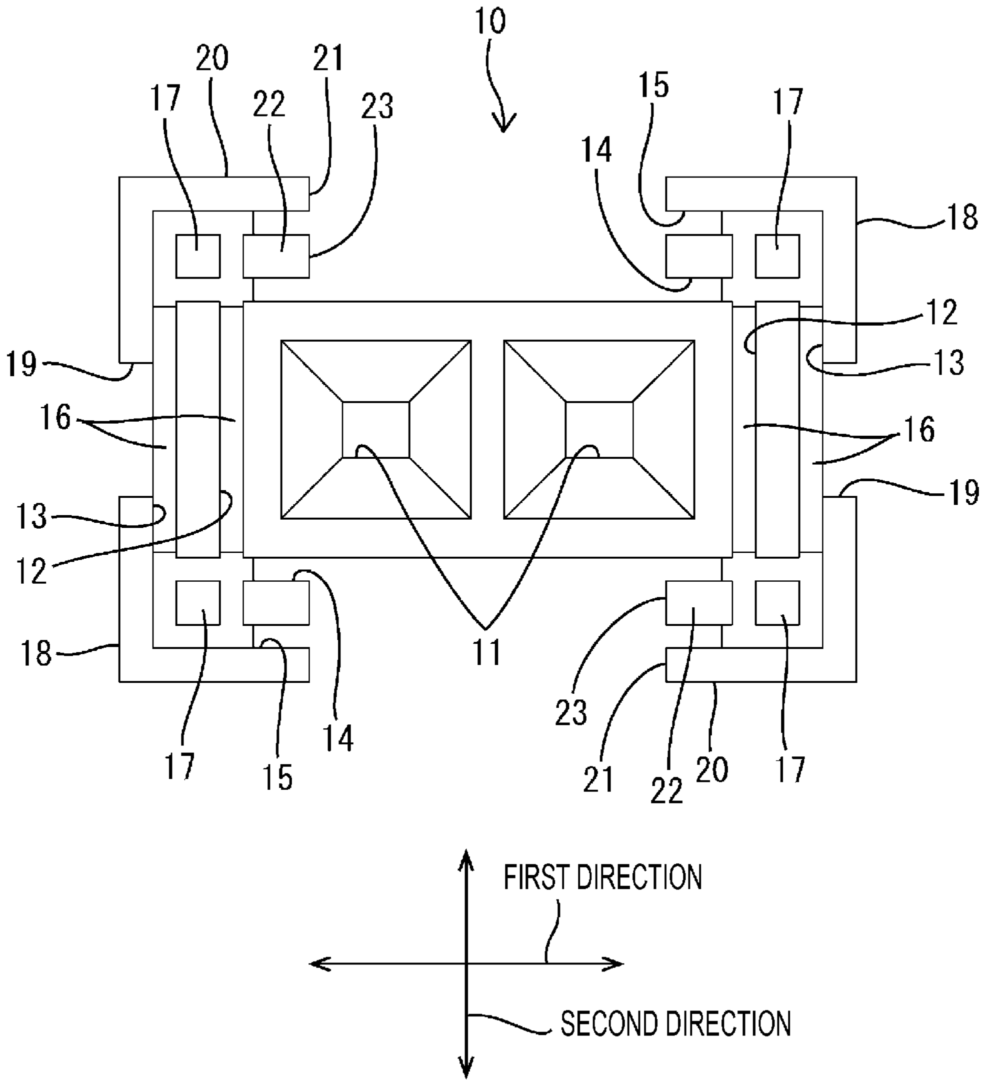
FIG. 2 is a plan view of the housing.

The housing 10 is made of synthetic resin and includes, as shown in FIGS. 1 and 2, a plurality of accommodating portions 11. The respective accommodating portions 11 are laterally paired and configured as holes having a rectangular cross-section and vertically penetrating through the housing 10. The terminal fittings 40 are inserted into the accommodating portions 11 (see FIG. 9).

The housing 10 has a rectangular outer shape in a plan view having an arrangement direction of the respective accommodating portions 11 as a longitudinal direction and a direction orthogonal to the arrangement direction of the respective accommodating portion 11 as a transverse direction. In the present disclosure, the longitudinal direction of the housing 10 is referred to as a first direction and the transverse direction of the housing 10 is referred to as a second direction as shown in FIGS. 1 and 2.

The housing 10 includes mounting portions 12 to 15 at a plurality of positions at different distances from the respective accommodating portions 11 (central part of the housing 10) to an outer side (radially outer side, outer peripheral side). The respective mounting portions include first mounting portions 12, 13 arranged on both sides in the first direction across the respective accommodating portions 11 and second mounting portions 14, 15 arranged on both sides in the second direction across the respective accommodating portions 11.

The respective first mounting portions include inner first mounting portions 12 at a short distance from the respective accommodating portions 11 and outer first mounting portions 13 at a long distance from the respective accommodating portions 11. The inner first mounting portions 12 are arranged in proximity to the respective accommodating portions 11 on both sides in the first direction of the respective accommodating portions 11. The outer first mounting portions 13 are arranged away from the respective accommodating portions 11 on both sides in the first direction of the respective accommodating portions 11.

The inner and outer first mounting portions 12, 13 are in the form of grooves extending in a vertical direction, the upper ends thereof are open in the upper surface of the housing 10, and the lower ends thereof are closed by supporting portions 16 formed on a lower surface side of the housing 10. Further, the inner and outer first mounting portions 12, 13 have a slit shape elongated in the second direction in a plan view and are arranged in parallel to each other.

The respective second mounting portions include inner second mounting portions 14 at a short distance from the respective accommodating portions 11 and outer second mounting portions 15 at a long distance from the respective accommodating portions 11. The inner second mounting portions 14 are arranged in proximity to the respective accommodating portions 11 on both sides in the second direction of the respective accommodating portions 11. The outer second mounting portions 15 are arranged away from the respective accommodating portions 11 on both sides in the second direction of the respective accommodating portions 11.

The inner and outer second mounting portions 14, 15 are in the form of grooves extending in the vertical direction, the upper ends thereof are open in the upper surface of the housing 10, and the lower ends thereof are open in the lower surface of the housing 10. Further, the inner and outer second mounting portions 14, 15 have a slit shape elongated in the first direction in a plan view and are arranged in parallel to each other.

The housing 10 includes corner portions 17 in the form of rectangular columns in four corner parts. The respective mounting portions 12 to 15 intersect each other on upper surface sides of the corner portions 17 in the four corner parts of the housing 10. Specifically, both end parts in the second direction of the respective first mounting portions 12, 13 communicate with the respective second mounting portions 14, 15 while intersecting at a right angle to the respective second mounting portions 14, 15. Both end parts in the first direction of the respective second mounting portions 14, 15 communicate with the respective first mounting portions 12, 13 while intersecting at a right angle to the respective first mounting portions 12, 13. Groove surfaces in the end parts of the respective mounting portions 12 to 15 form a rectangular recess in a plan view on the outer periphery of the upper surface of the corner portion 17.

Out of four side surfaces of the housing 10, first side surfaces 18 mutually facing toward opposite sides in the first direction include first cut portions 19 cut to have a constant width over the entire length in the vertical direction in intermediate parts in the second direction. The outer first mounting portions 13 are open in the first side surfaces 18 of the housing 10 via the first cut portions 19.

Out of the four side surfaces of the housing 10, second side surfaces 20 mutually facing toward opposite sides in the second direction include second cut portions 21 cut to have a constant width over the entire length in the vertical direction in intermediate parts in the first direction. The outer second mounting portions 15 are open in the second side surfaces 20 of the housing 10 via the second cut portions 21. An opening width of the second cut portion 21 is larger than that of the first cut portion 19.

A separation wall 22 formed between the inner second mounting portion 14 and the outer second mounting portion 15 in the housing 10 has an inner cut portion 23 cut to have a constant width over the entire length in the vertical direction in an intermediate part in the first direction. The inner cut portion 23 is shaped to correspond to the second cut portion 21 in a region formed by projecting the second cut portion 21 on the separation wall 22.

<Shield Member 50, 51>

Figure 5:
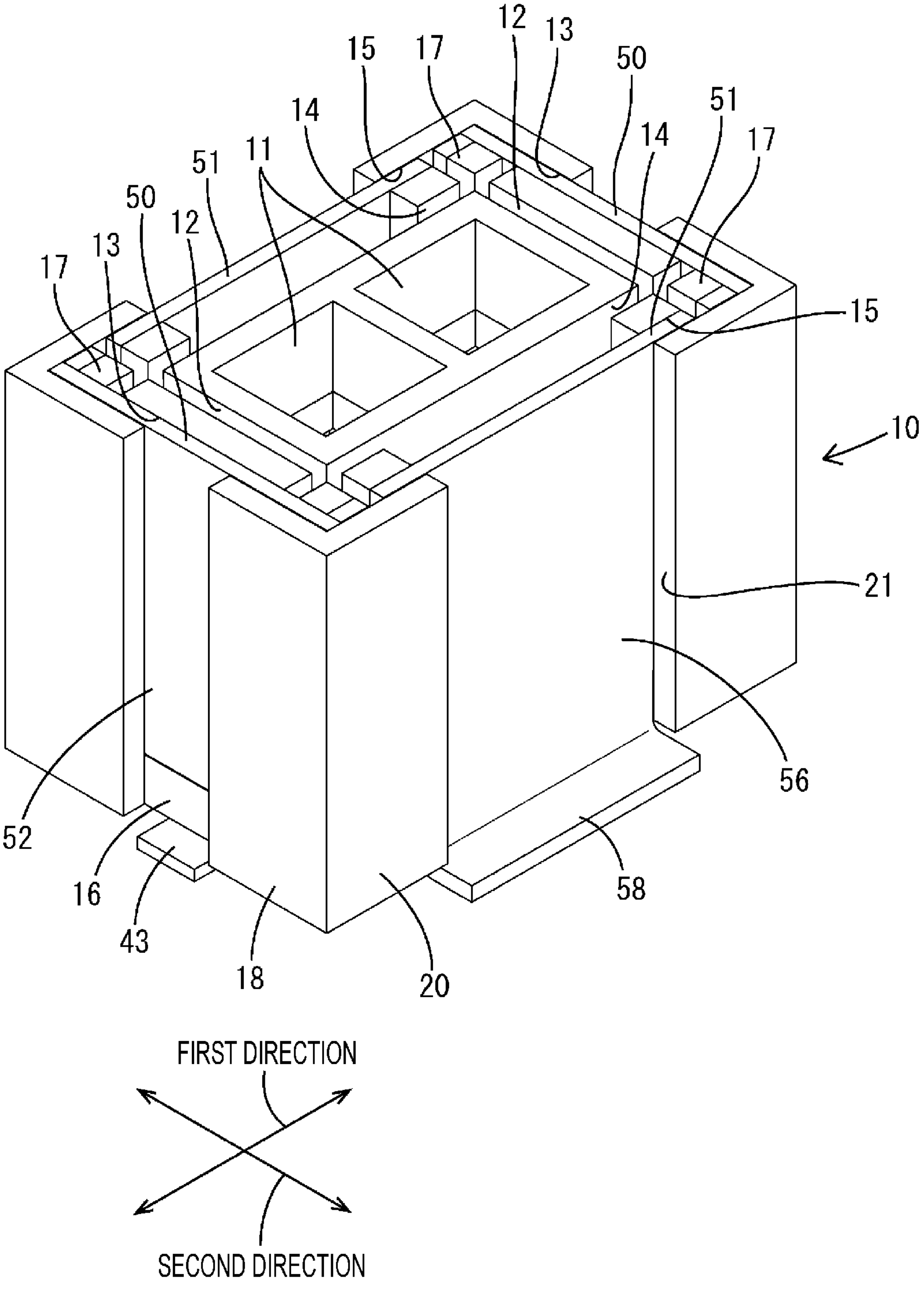
FIG. 5 is a perspective view showing a state where the first shield plates are mounted in outer first mounting portions and the second shield plates are mounted in outer second mounting portions.
Figure 6:
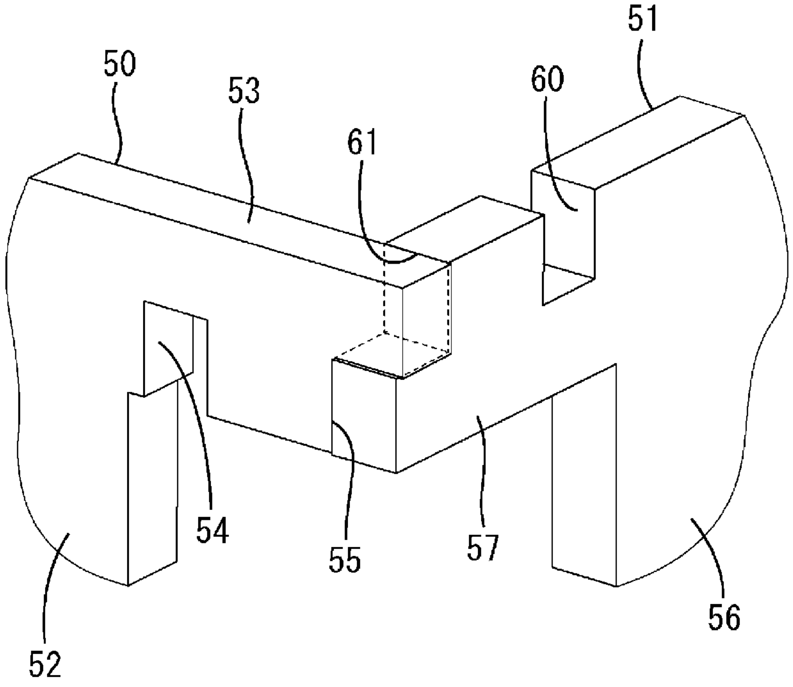
FIG. 6 is an enlarged perspective view of a part in which an outer first fitting portion and an outer second fitting portion are fit and a first contact portion and a second contact portion are in contact in the state of FIG. 5.
Figure 7:
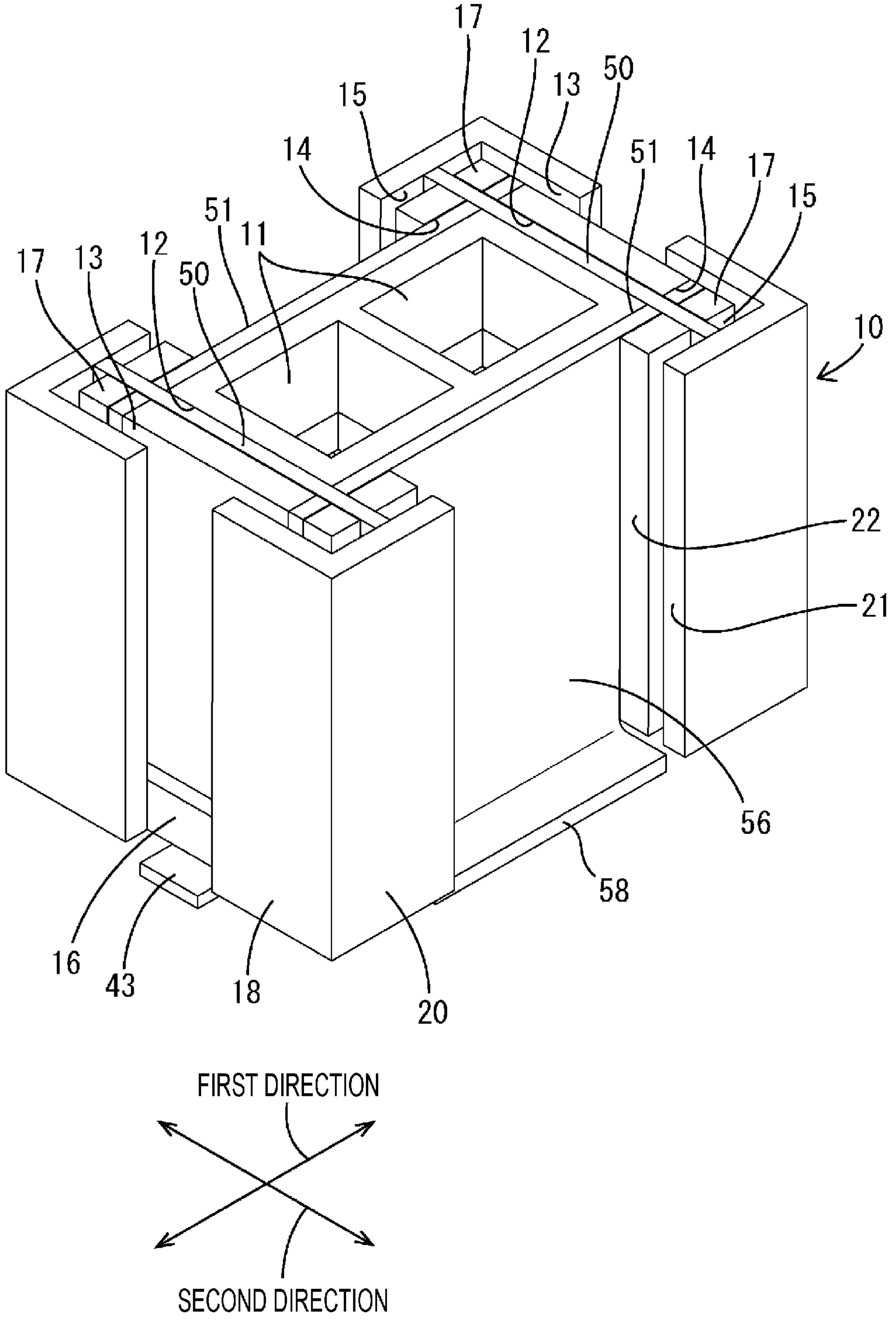
FIG. 7 is a perspective view showing a state where the first shield plates are mounted in inner first mounting portions and the second shield plates are mounted in inner second mounting portions.

The shield member 50, 51 is a metal plate member and mounted in the appropriate mounting portions selected from the respective mounting portions 12 to 15. As shown in FIGS. 5 to 7, the shield member includes first shield plates 50 to be commonly mounted into the respective inner and outer first mounting portions 12, 13 and second shield plates 51 to be commonly mounted into the respective inner and outer second mounting portions 14, 15.

Figure 3:
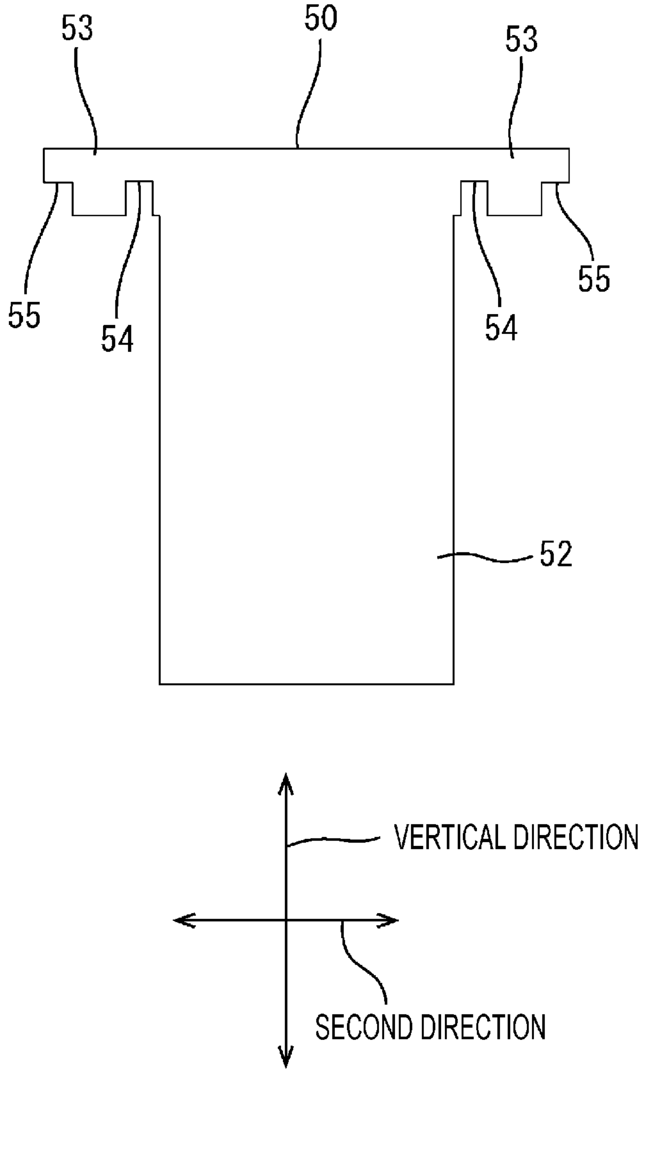
FIG. 3 is a view of a first shield plate viewed from a first direction.

As shown in FIG. 3, the first shield plate 50 includes a first shield body 52 in the form of a rectangular flat plate along the vertical direction and second direction and first contact portions 53 in the form of projection pieces projecting toward both sides in the second direction from the upper end of the first shield body 52. A plate thickness of the first shield plate 50 is equal to or larger than an opening width (opening dimension in the first direction) of the first mounting portion 12, 13. The first shield plate 50 is press-fit into the first mounting portion 12, 13 from above.

The first contact portion 53 includes an inner first fitting portion 54 at a position near the first shield body 52 and an outer first fitting portion 55 on an end side away from the first shield body 52. The inner and outer first fitting portions 54, 55 are open in the lower end of the first contact portion 53 to form rectangular openings. The outer first fitting portion is also open in the end part in the second direction of the first contact portion 53.

Figure 4:
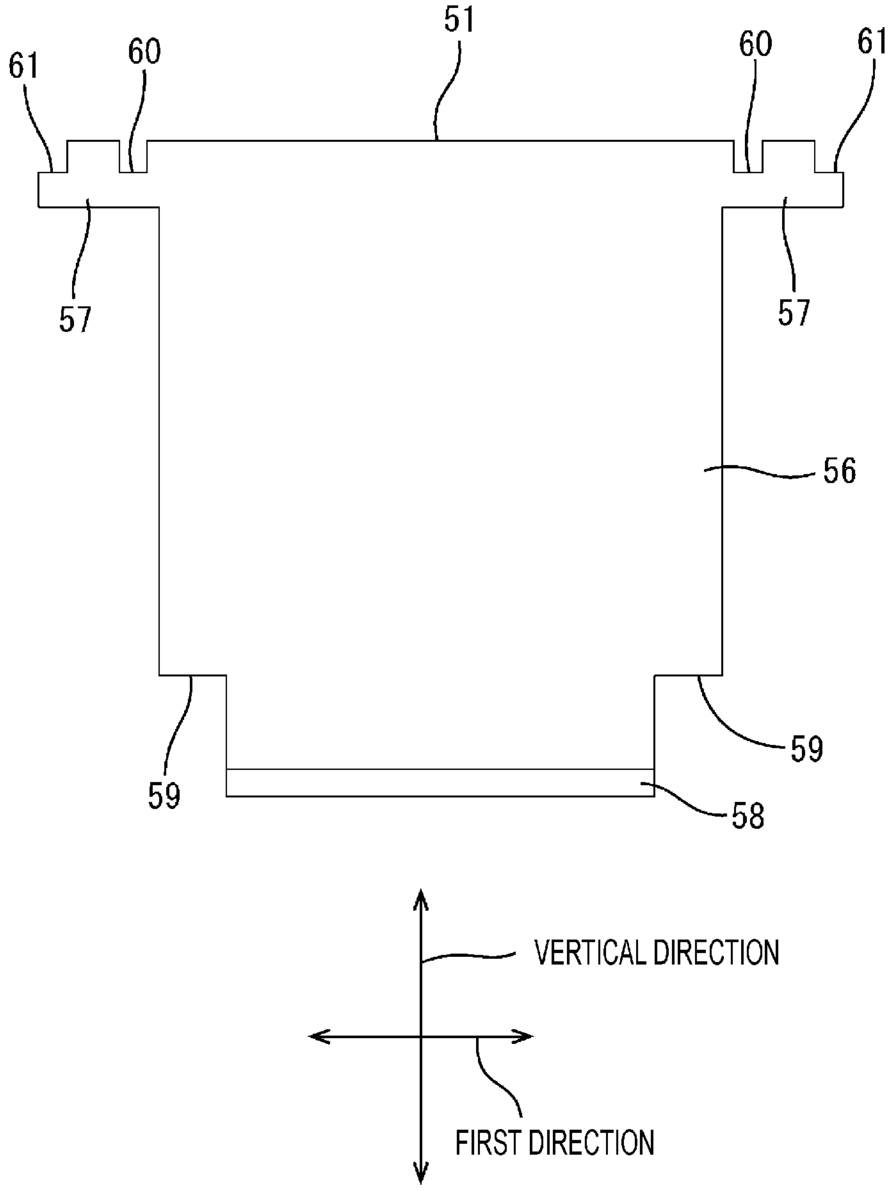
FIG. 4 is a view of a second shield plate viewed from a second direction.

As shown in FIG. 4, the second shield plate 51 includes a second shield body 56 in the form of a rectangular flat plate along the vertical direction and first direction, second contact portions 57 in the form of projection pieces projecting toward both sides in the first direction from the upper end of the second shield body 56 and a board connecting portion 58 projecting in the second direction from the lower end of the second shield body 56. A plate width of the second shield plate 56 is larger than that of the first shield body 52.

Figure 9:
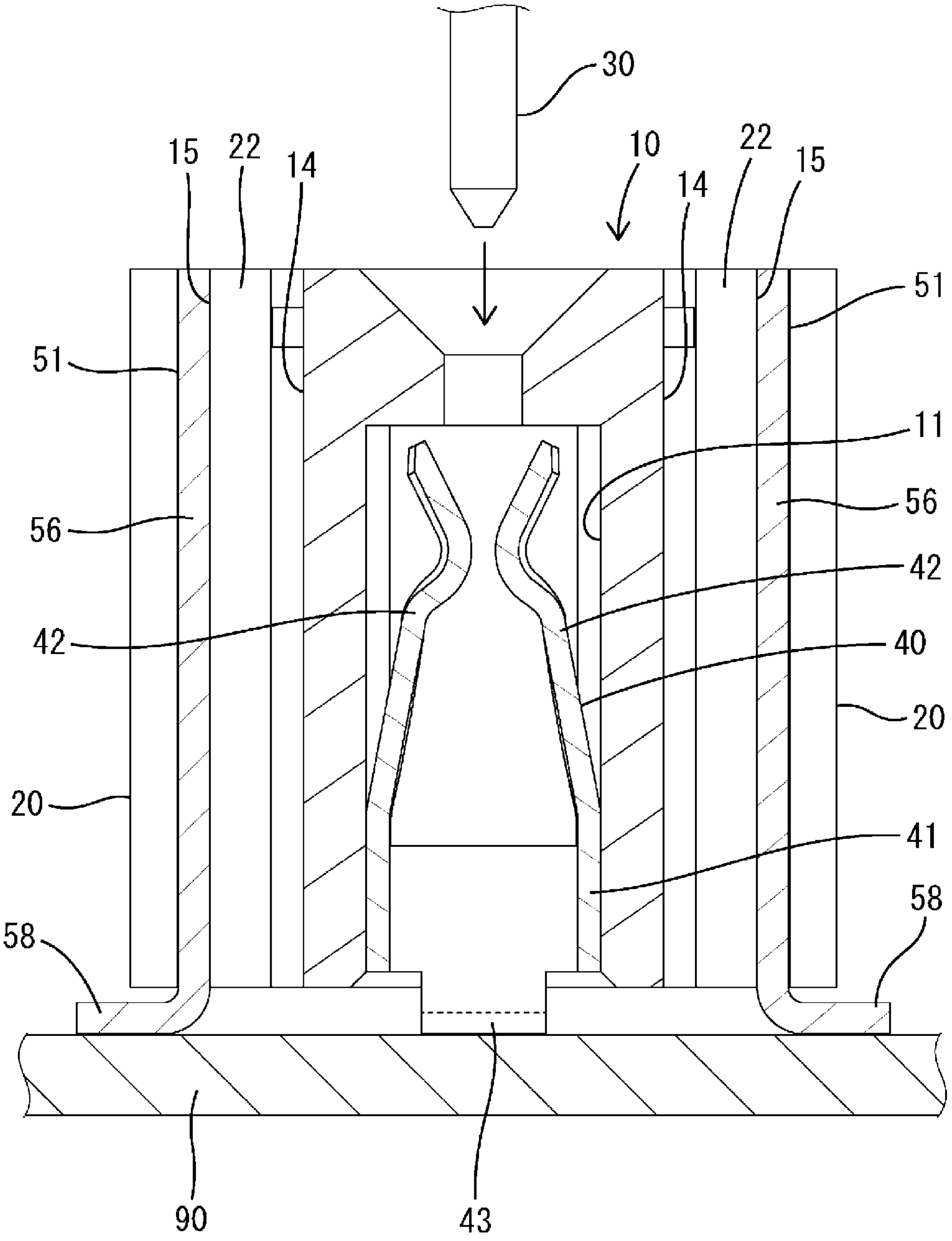
FIG. 9 is a section showing a state where a terminal fitting is accommodated in an accommodating portion of the housing when viewed from the first direction.

The second shield body 56 and the board connecting portion 58 have plate surfaces orthogonal to each other and are L-shaped when viewed from the first direction (see FIG. 9). The second shield body 56 includes rectangular stepped portions 59 in lower end parts on both sides in the first direction. The lower end of the second shield body 56 is narrowed via the stepped portions 59. The board connecting portion 58 is connected over the entire length on the lower end of the second shield body 56. As shown in FIG. 9, the lower surface (downward facing plate surface) of the board connecting portion 58 is arranged along a surface of a circuit board 90 and fixed to the circuit board 90 by soldering. Further, the board connecting portion 58 is ground-connected to the circuit board 90.

A plate thickness of the second shield plate 51 is equal to or larger than an opening width (opening dimension in the second direction) of the second mounting portions 14, 15. A plate width of the board connecting portion 58 is smaller than a groove width of the second cut portion 21 (same as the groove width of the inner cut portion 23). The second shield plate 51 is press-fit into the second mounting portion 14, 15 from above.

As shown in FIG. 4, the second contact portion 57 includes an inner second fitting portion 60 at a position near the second shield body 56 and an outer second fitting portion 61 on an end side away from the second shield body 56. The inner and outer second fitting portions 60, 61 are open in the upper end of the second contact portion 57 to form rectangular openings. The outer second fitting portion 61 is also open in the end part in the first direction of the second contact portion 57.

<Terminal Fittings 40>

The terminal fitting 40 is integrally formed, such as by bending a conductive metal plate. As shown in FIG. 9, the terminal fitting 40 includes a base portion 41, a pair of resilient pieces 42 projecting upward from the base portion 41 and a lead portion 43 laterally projecting from the lower end of the base portion 41. The respective resilient pieces 42 are arranged to face each other. A connecting part of a mating terminal 30 is inserted between the respective resilient pieces 42 to be electrically connected. The base portion 41 includes an unillustrated locking structure to be locked to the housing 10. The lead portion 43 is so arranged below the housing 10 that a tip part projects outward in the first direction with the terminal fitting 40 inserted in the accommodating portion 11. The lower surface (downward facing plate surface) of the lead portion 43 is arranged along the surface of the circuit board 90 and connected to a conductive part formed on the circuit board 90 by soldering.

<Mounting Structure of Shield Member 50, 51>

The shield member of this embodiment is composed of two types of plate members including the first shield plates 50 and the second shield plates 51. In the housing 10, a pair of the first shield plates 50 are arranged on both sides in the first direction across the respective accommodating portions 11 and a pair of the second shield plates 51 are arranged on both sides in the second direction across the respective accommodating portions 11. The pair of first shield plates 50 have the same shape, and the pair of second shield plates 51 have the same shape.

For example, in the case of a mode shown in FIG. 5, the second shield plates 51 are respectively press-fit and mounted into the outer second mounting portions 15 arranged on both sides in the second direction across the respective accommodating portions 11 and, subsequently, the first shield plates 50 are respectively press-fit and mounted into the outer first mounting portions 13 arranged on both sides in the first direction across the respective accommodating portions 11.

The second contact portions 57 of the second shield plates 51 are disposed on the outer groove surfaces of the corner portions 17. In this way, a press-fitting operation of the second shield plates 51 is restricted and the second shield plates 51 are properly mounted into the outer second mounting portions 15. The board connecting portions 58 of the second shield plates 51 are arranged to project outward in the second direction through the second cut portions 21.

The lower ends of the first shield plates 50 can be supported on the outer supporting portions 16. The first contact portions 53 of the first shield plates 50 are disposed on the outer groove surfaces of the corner portions 17. In this way, a press-fitting operation of the first shield plates 50 is restricted and the first shield plates 50 are properly mounted into the outer first mounting portions 13.

As shown in FIG. 6, the outer first fitting portion 55 of the first contact portion 53 is fit into the outer second fitting portion 61 of the second contact portion 57 from above, and the first and second contact portions 53, 57 are engaged and held in contact with each other while being orthogonal to each other.

Thereafter, the connector is placed on the surface of the circuit board 90, and the board connecting portions 58 of the second shield plates 51 and the lead portions 43 of the terminal fittings 40 are connected to the circuit board 90 by soldering. When the second shield plates 51 are ground-connected to the circuit board 90, the first shield plates 51 are also grounded via the first and second contact portions 53, 57.

Further, for example, in the case of a mode shown in FIG. 7, the second shield plates 51 are respectively press-fit and mounted into the inner second mounting portions 14 arranged on both sides in the second direction across the respective accommodating portions 11 and, subsequently, the first shield plates 50 are respectively press-fit and mounted into the inner first mounting portions 12 arranged on both sides in the first direction across the respective accommodating portions 11.

The second contact portions 57 of the second shield plates 51 are disposed on the inner groove surfaces of the corner portions 17. In this way, a press-fitting operation of the second shield plates 51 is restricted and the second shield plates 51 are properly mounted into the inner second mounting portions 14. The board connecting portions 58 of the second shield plates 51 are arranged to project outward in the second direction through the inner cut portions 23 and the second cut portions 21.

The lower ends of the first shield plates 50 can be supported on the inner supporting portions 16. The first contact portions 53 of the first shield plates 50 are disposed on the inner groove surfaces of the corner portions 17. In this way, a press-fitting operation of the first shield plates 50 is restricted and the first shield plates 50 are properly mounted into the inner first mounting portions 12.

Figure 8:
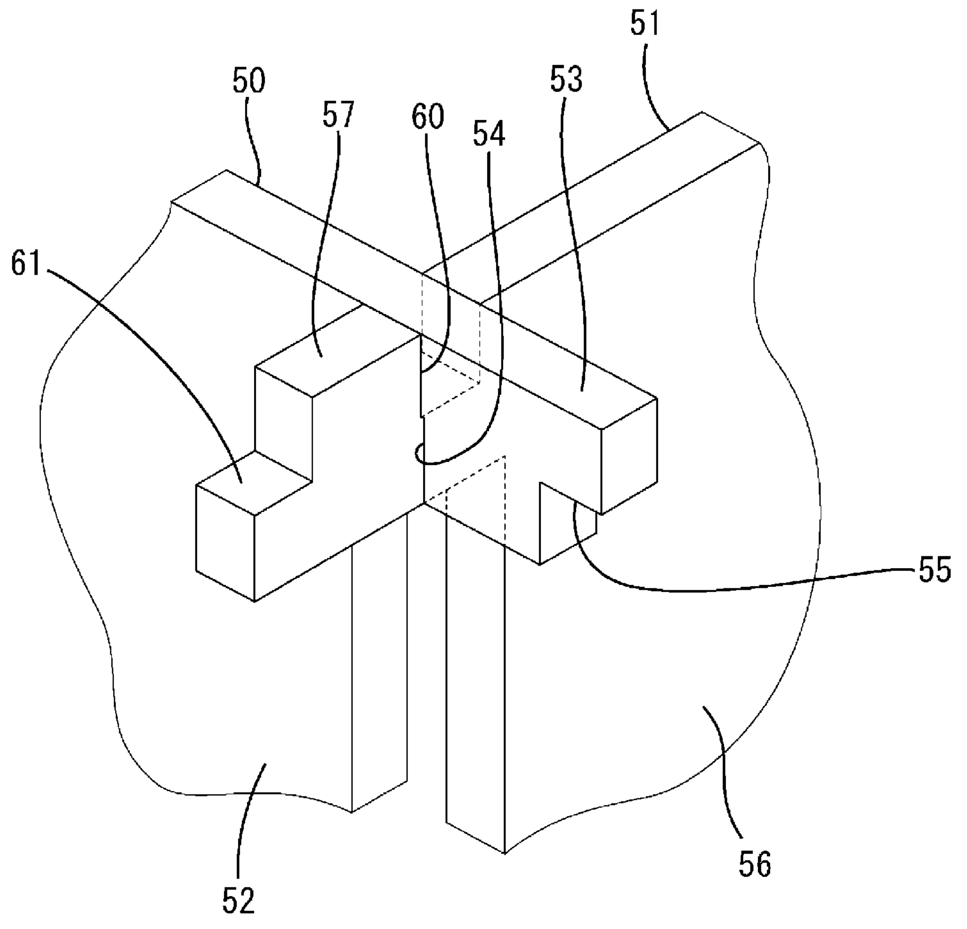
FIG. 8 is an enlarged perspective view of a part in which an inner first fitting portion and an inner second fitting portion are fit and the first and second contact portions are in contact in the state of FIG. 7.

As shown in FIG. 8, the inner first fitting portion 54 of the first contact portion 53 is fit into the inner second fitting portion 60 of the second contact portion 57 from above, and the first and second contact portions 53, 57 are engaged and held in contact with each other while being orthogonal to each other. Thereafter, the connector is placed on the surface of the circuit board 90, and the board connecting portions 58 of the second shield plates 51 and the lead portions 43 of the terminal fittings 40 are connected to the circuit board 90 by soldering.

The mode shown in FIG. 7 may be applied when an impedance of a mating member (mating connector or the like) is higher than in the mode shown in FIG. 5. By so doing, transmission characteristics of the entire connector can be satisfactorily adjusted and a change of the mating member can be flexibly dealt with.

As just described, according to this embodiment, the transmission characteristics of the connector can be matched with those of the mating member by mounting the shield member 50, 51 into the appropriate mounting portions selected from the plurality of mounting portions 12 to 15. Thus, it is not necessary to newly provide a housing or the like for the adjustment of the transmission characteristics and a manufacturing cost increase can be suppressed.

Further, since any of the respective mounting portions 12 to 15 is in the form of a groove, a mold structure for molding the respective mounting portions 12 to 15 is not particularly complicated. Moreover, the shield member 50, 51 can be easily mounted by being press-fit into the respective mounting portions 12 to 15.

Further, since the shield member includes the first and second shield plates 50, 51 and is configured by combining a plurality of types of plate members, a variation range can be widened in selecting the mount position of the shield member 50, 51 with respect to the respective mounting portions 12 to 15.

Further, since the first shield plates 50 are plate members having the same shape and commonly used for the inner and outer first mounting portions 12, 13 and the second shield plates 51 are plate members having the same shape and commonly used for the inner and outer second mounting portions 14, 15, an increase in the number of components can be prevented.

Further, since the first and second shield plates 50, 51 include the first and second contact portions 53, 57 for contacting each other while intersecting each other, it is not necessary to provide an individual earth circuit (ground circuit) for each of the first and second shield plates 50, 51 and a structure can be simplified.

Furthermore, the inner first fitting portion 54 and the outer first fitting portion 55 serving as contact parts with the second shield plate 51 are arranged at positions corresponding to the inner and outer second mounting portions 14, 15 in the first contact portion 53 and the inner second fitting portion 60 and the outer second fitting portion 61 serving as contact parts with the first shield plate 50 are arranged at positions corresponding to the inner and outer first mounting portions 12, 13 in the second contact portion 57. Thus, the first and second shield plates 50, 51 can maintain the contact state even if relative positions thereof are changed. As a result, various transmission characteristics can be easily dealt with.

Furthermore, since the second shield plates 51 include the board connecting portions 58 and the housing 10 is fixed to the circuit board 90 via the board connecting portions 58, it is not necessary to provide a dedicated member for fixing the housing 10 to the circuit board and the structure of the connector can be simplified.

Other Embodiments of Present Disclosure

The embodiments disclosed this time should be considered illustrative in all aspects, rather than restrictive.

Although each mounting portion 12 to 15 is in the form of a groove in the case of the above embodiment, each mounting portion may not be in the form of a groove as another embodiment if the shield member is mountable. For example, at least one of the outer mounting portions may be a projection projecting on the side surface of the housing or a recess provided in the side surface of the housing. In this case, the shield member may be provided with a locking structure lockable to the projection or recess.

Although the shield member 50, 51 is in the form of flat plates to be individually mountable into the respective mounting portions 12 to 15 in the case of the above embodiment, a shield member may be formed into a tubular shape to be collectively mountable into the respective mounting portions as another embodiment.

Although the mounting portions 12 to 15 are provided on the inner and outer sides of the housing 10 in the case of the above embodiment, mounting portions may be provided at three or more positions in an in-out direction of a housing (direction from a central part of the housing toward an outer side) as another embodiment.

Although the second shield plate 51 is provided with the board connecting portion 58 in the case of the above embodiment, a first shield plate may be provided with a board connecting portion or both first and second shield plates may be provided with board connecting portions as another embodiment. A shield member may include no board connecting portion.

In the case of the above embodiment, the housing 10 has a rectangular outer shape in a plan view, the longitudinal direction of the housing 10 is the first direction and the transverse direction of the housing 10 is the second direction. However, if a housing has a square outer shape in a plan view as another embodiment, a direction parallel to one side surface may be set as a first direction and a direction parallel to another side surface orthogonal to the one side surface may be set as a second direction.

Although the housing 10 has a rectangular outer shape in a plan view in the case of the above embodiment, a housing may have a circular outer shape in a plan view as another embodiment. In this case, a shield member is formed into a hollow cylindrical shape as a whole.

Although the first mode in which the shield member 50, 51 is mounted in the outer mounting portions 13, 15 and the second mode in which the shield member 50, 51 is mounted in the inner mounting portions 12, 14 are described in the case of the above embodiment, a mode in which first shield plates are mounted in outer first mounting portions and second shield plates are mounted in inner second mounting portions or a mode in which first shield plates are mounted in inner first mounting portions and second shield plates are mounted in outer second mounting portions may be, for example, adopted as another embodiment.

LIST OF REFERENCE NUMERALS

10 . . . housing
11 . . . accommodating portion
12 . . . inner first mounting portion (mounting portion)
13 . . . outer first mounting portion (mounting portion)
14 . . . inner second mounting portion (mounting portion)
15 . . . outer second mounting portion (mounting portion)
16 . . . supporting portion
17 . . . corner portion
18 . . . first side surface
19 . . . first cut portion
20 . . . second side surface
21 . . . second cut portion
22 . . . separation wall
23 . . . inner cut portion
30 . . . mating terminal
40 . . . terminal fitting
41 . . . base portion
42 . . . resilient piece
43 . . . lead portion
50 . . . first shield plate (shield member)
51 . . . second shield plate (shield member)
52 . . . first shield body
53 . . . first contact portion
54 . . . inner first fitting portion
55 . . . outer first fitting portion
56 . . . second shield body
57 . . . second contact portion
58 . . . board connecting portion
59 . . . stepped portion
60 . . . inner second fitting portion
61 . . . outer second fitting portion
90 . . . circuit board

What is claimed is:

1. A connector, comprising:
a housing including an accommodating portion and mounting portions;
a terminal fitting to be accommodated into the accommodating portion; and
a shield to be mounted into the mounting portions for shielding electromagnetic waves,
wherein:
the accommodating portion is provided in a central part of the housing,
the mounting portions are provided on an outer peripheral side of the central part in the housing and include a first plurality of the mounting portions on each of both sides in a first direction across the accommodating portion and a second plurality of the mounting portions on each of both sides in a second direction intersecting the first direction across the accommodating portion, and
each of the first plurality of the mounting portions and the second plurality of the mounting portions are in the form of a groove having one open end facing upward in a same surface of the housing.

2. The connector of claim 1, wherein:
the first plurality of mounting portions are arranged on both sides in a first direction across the accommodating portion and the second plurality of mounting portions are arranged on both sides in a second direction intersecting the first direction across the accommodating portion, and
the shield includes first shield plates to be mounted into the first mounting portions and second shield plates to be mounted into the second mounting portions.

3. The connector of claim 2, wherein each of the first shield plates and the second shield plates include first contact portions and second contact portions, respectively, for contacting each other while intersecting each other.

4. The connector of claim 1, wherein the shield includes a board connecting portion to be connected to a circuit board, and the housing is fixed to the circuit board via the board connecting portion.

5. The connector of claim 1, wherein the first plurality of the mounting portions include a first pair of inner mounting portions positioned on either side of the accommodating portion and a first pair of outer mounting portions positioned outside each of the first pair of inner mounting portions and the second plurality of the mounting portions include a second pair of inner mounting portions positioned on either side of the accommodating portion and a second pair of outer mounting portions positioned outside each of the second pair of inner mounting portions.

6. The connector of claim 5, wherein the shield includes a pair of first shield plates being sized to be mountable into any of the first plurality of mounting portions and a pair of second shield plates being sized to be mountable into any of the second plurality of mounting portions.

7. A connector, comprising:
a housing including an accommodating portion and mounting portions;
a terminal fitting to be accommodated into the accommodating portion; and a shield to be mounted into the mounting portions for shielding electromagnetic waves, wherein:

the mounting portions are provided at a plurality of positions at different distances from the accommodating portion, the mounting portions include first mounting portions arranged on both sides in a first direction across the accommodating portion and second mounting portions arranged on both sides in a second direction intersecting the first direction across the accommodating portion, each of the first mounting portions and the second mounting portions are in the form of a groove having one open end facing upward in a same surface of the housing, the shield includes first shield plates to be mounted into the first mounting portions and second shield plates to be mounted into the second mounting portions, the first shield plates are plate members having the same shape and are mountable in any of a plurality of the first mounting portions at different distances in the first direction from the accommodating portion and the second shield plates are plate members having the same shape and are mountable in any of a plurality of the second mounting portions at different distances in the second direction from the accommodating portion.

* * * * *